(12) United States Patent
Carlson et al.

(10) Patent No.: US 7,261,238 B1
(45) Date of Patent: Aug. 28, 2007

(54) METHOD OF LOCATING IMAGED BAR CODES FOR AN IMAGING-BASED BAR CODE READER

(75) Inventors: Brad Carlson, Huntington, NY (US); Thomas E. Lackemann, Syaville, NY (US); Robert James Pang, Williston Park, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/441,728

(22) Filed: May 26, 2006

(51) Int. Cl.
*G06K 5/04* (2006.01)

(52) U.S. Cl. ............................ 235/462.08; 235/462.45; 235/462.41

(58) Field of Classification Search ........... 235/462.25, 235/462.06, 462.14, 462.24, 454
See application file for complete search history.

(56) References Cited

U.S. PATENT DOCUMENTS

| | | | | |
|---|---|---|---|---|
| 5,949,052 A * | 9/1999 | Longacre et al. | ...... | 235/462.08 |
| 6,123,263 A * | 9/2000 | Feng | ...... | 235/462.42 |
| 6,128,420 A * | 10/2000 | Shin et al. | ...... | 382/317 |
| 6,340,114 B1* | 1/2002 | Correa et al. | ...... | 235/462.22 |
| 6,688,525 B1* | 2/2004 | Nelson et al. | ...... | 235/462.21 |
| 6,729,546 B2* | 5/2004 | Roustaei | ...... | 235/462.45 |
| 2001/0019618 A1* | 9/2001 | Rhoads | ...... | 382/100 |
| 2003/0062418 A1* | 4/2003 | Barber et al. | ...... | 235/462.45 |
| 2003/0150917 A1* | 8/2003 | Tsikos et al. | ...... | 235/454 |
| 2005/0135656 A1* | 6/2005 | Alattar et al. | ...... | 382/100 |

* cited by examiner

*Primary Examiner*—Michael G. Lee
*Assistant Examiner*—Tuyen Kim Vo
(74) *Attorney, Agent, or Firm*—Tarolli, Sundheim, Covell & Tummino LLP

(57) ABSTRACT

A method of locating an imaged bar code in a captured image frame for an imaging-based bar code reader. The steps of the method include: a) determining a mode of operation of the reader; b) if the reader is being operated in a hand-held mode of operation, utilizing a first method of locating an imaged bar code; and c) if the reader is being operated in a fixed position mode, utilizing a second method of locating an imaged bar code. The first method of locating an imaged bar code includes searching for an imaged bar code commencing at a starting location near a geographic center of the selected image frame. The second method of locating an imaged bar code includes determining a location corresponding to movement in a selected image frame of the series of image frames and searching for an imaged bar code commencing at the movement location.

22 Claims, 8 Drawing Sheets

METHOD OF LOCATING IMAGED BAR CODES FOR AN IMAGING-BASED BAR CODE READER

FIELD OF THE INVENTION

The present invention relates to a method of locating imaged bar codes within a captured image frame of an imaging-based bar code reader.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Systems that read and decode bar codes employing imaging systems are typically referred to as imaging-based bar code readers or bar code scanners.

Imaging systems include charge coupled device (CCD) arrays, complementary metal oxide semiconductor (CMOS) arrays, or other imaging pixel arrays having a plurality of photosensitive elements (photosensors) or pixels. An illumination system comprising light emitting diodes (LEDs) or other light source directs illumination toward a target object, e.g., a target bar code. Light reflected from the target bar code is focused through a lens of the imaging system onto the pixel array. Thus, an image of a field of view of the focusing lens is focused on the pixel array. Periodically, the pixels of the array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

Decoding an imaged bar code requires the decoding circuitry to identify the imaged bar code within a captured image frame. The more quickly the imaged bar code can be located within an image frame, the more quickly the decoding circuitry can operate on the appropriate portions of the image frame to decode the imaged bar code. Decreasing the time required to read, that is, to image and decode a target bar code, is of paramount importance to designers of bar code readers. Thus, methods that decrease, on the average, the time required to locate an imaged bar code in a captured data frame are of great interest.

Complicating the problem of efficiently locating an imaged bar code within a captured image frame is the fact that some imaging-based bar code readers are used in two different modes of operation, hand-held and fixed position. In the hand-held mode of operation, a user moves the reader housing with respect to a target bar code to "aim" the imaging system of the reader at a target bar code. This is sometimes referred to as the point-and-shoot mode of operation. Here the reader is moved and the item to which the bar code is affixed is typically in a fixed position or relatively fixed position. In the fixed position mode of operation, the bar code reader is fixed position, i.e., the reader housing is positioned on a sales counter, and the object that the target bar code is affixed to is moved by the user toward the reader such that the target bar code is brought within a field of view of the fixed position reader.

Unfortunately, it has been found that a method of locating an imaged bar code within a captured image frame that may be efficient for one mode of reader operation may not be as efficient for locating an imaged bar code in the other mode of reader operation. What is needed is a method of locating an imaged bar code within a captured image frame that is efficient for both modes of operation of an imaging-based bar code reader

SUMMARY OF THE INVENTION

The present invention concerns a method of locating an imaged bar code in a captured image frame for an imaging-based bar code reader. The steps of the method include: a) determining a mode of operation of the reader; b) if the reader is being operated in a hand-held mode of operation, utilizing a first method of locating an imaged bar code; and c) if the reader is being operated in a fixed position mode, utilizing a second method of locating an imaged bar code. The first method of locating an imaged bar code includes the steps of: 1) selecting a captured image frame; 2) searching for an imaged bar code commencing at a starting location near a geographic center of the selected image frame; and 2) if no imaged bar code is found at the starting location, utilizing a search pattern to search outwardly from the starting location until an imaged bar code is found. In one preferred embodiment, the search pattern searches outwardly in a spiral or circular pattern from the starting location.

The second method of locating an imaged bar code includes the steps of: 1) analyzing a series of captured image frames for changes in the series of captured image frames indicative of a movement of an object in the series of captured image frames; 2) determining a location corresponding to the movement in a selected image frame of the series of captured image frames; 3) searching for an imaged bar code commencing at the movement location within the selected image frame; and 4) if no imaged bar code is found at the movement location, utilizing a search pattern to search outwardly from the movement location until an imaged bar code is found. In one preferred embodiment, the steps of the second method further including determining a direction of the movement of the object in the series of captured image frames and, if no imaged bar code is found at the movement location, the search pattern searches outwardly from the movement location in the direction of the movement of the object.

In another aspect, the present invention concerns an imaging-based bar code reader that utilizes first and second methods of locating an imaged bar code in a captured image frame, depending on a mode of operation of the bar code reader. If the bar code reader is operated in a hand-held mode, the first method of locating an imaged bar code includes the steps of: 1) selecting a captured image frame; 2) searching for an imaged bar code commencing at a starting location near a geographic center of the selected image frame; and 3) if no imaged bar code is found at the starting location, utilizing a search pattern to search outwardly from the starting location until an imaged bar code is found. In one preferred embodiment, the search pattern searches outwardly in a spiral pattern from the starting location.

If the bar code reader is operated in a fixed position mode, the second method of locating an imaged bar code includes the steps of: 1) analyzing a series of captured image frames for changes in the series of captured image frames indicative of a movement of an object in the series of captured image frames; 2) determining a location corresponding to the movement in a selected image frame of the series of captured image frames; 3) searching for an imaged bar code commencing at the movement location within the selected image frame; and 4) if no imaged bar code is found at the movement location, utilizing a search pattern to search outwardly from the movement location until an imaged bar code is found. In one preferred embodiment, the steps of the second method further including determining a direction of the movement of the object in the series of captured image frames and, if no imaged bar code is found at the movement location, the search pattern searches outwardly from the movement location in the direction of the movement of the object.

In another aspect, the present invention concerns a computer-readable media having computer-executable instructions for performing a method of locating an imaged bar code in a captured image frame for an imaging-based bar code reader, the steps of the method comprising:

a) determining a mode of operation of the reader;

b) if the reader is being operated in a hand-held mode of operation, utilizing a first method of locating an imaged bar code wherein the first method of locating an imaged bar code includes the steps of:

1) selecting a captured image frame;

2) searching for an imaged bar code commencing at a starting location near a geographic center of the selected image frame; and 3) if no imaged bar code is found at the starting location, utilizing a search pattern to search outwardly from the starting location until an imaged bar code is found; and c) if the reader is being operated in a fixed position mode, utilizing a second method of locating an imaged bar code wherein the second method of locating an imaged bar code includes the steps of:

1) analyzing a series of captured image frames for changes in the series of captured image frames indicative of a movement of an object in the series of captured image frames;

2) determining a location corresponding to the movement in a selected image frame of the series of captured image frames;

3) searching for an imaged bar code commencing at the movement location within the selected image frame; and 4) if no imaged bar code is found at the movement location, utilizing a search pattern to search outwardly from the movement location until an imaged bar code is found.

In yet another aspect, the present invention also concerns an imaging-based bar code reader adapted to be used in a hand-held mode of operation and a fixed position mode of operation, the reader comprising:

a) means for imaging a target bar code and generating captured image frames of a field of view of the imaging system;

b) means for decoding an image of the target bar code located within a captured image frame;

c) the means for decoding utilizing a first method of locating an imaged bar code in a captured image frame if the reader is operated in the hand-held mode, the first method of locating an imaged bar code including the steps of:

1) selecting a captured image frame;

2) searching for an imaged bar code commencing at a starting location near a geographic center of the selected image frame; and 3) if no imaged bar code is found at the starting location, utilizing a search pattern to search outwardly from the starting location until an imaged bar code is found; and d) the means for decoding utilizing a second method of locating an imaged bar code in a captured image frame if the reader is operated in the stationary mode, the second method of locating an imaged bar code includes the steps of:

1) analyzing a series of captured image frames for changes in the series of captured image frames indicative of a movement of an object in the series of captured image frames;

2) determining a location corresponding to the movement in a selected image frame of the series of captured image frames;

3) searching for an imaged bar code commencing at the movement location within the selected image frame; and 4) if no imaged bar code is found at the movement location, utilizing a search pattern to search outwardly from the movement location until an imaged bar code is found.

These and other objects, advantages, and features of the exemplary embodiment of the invention are described in detail in conjunction with the accompanying drawings.

DETAILED DESCRIPTION

Figure 1:
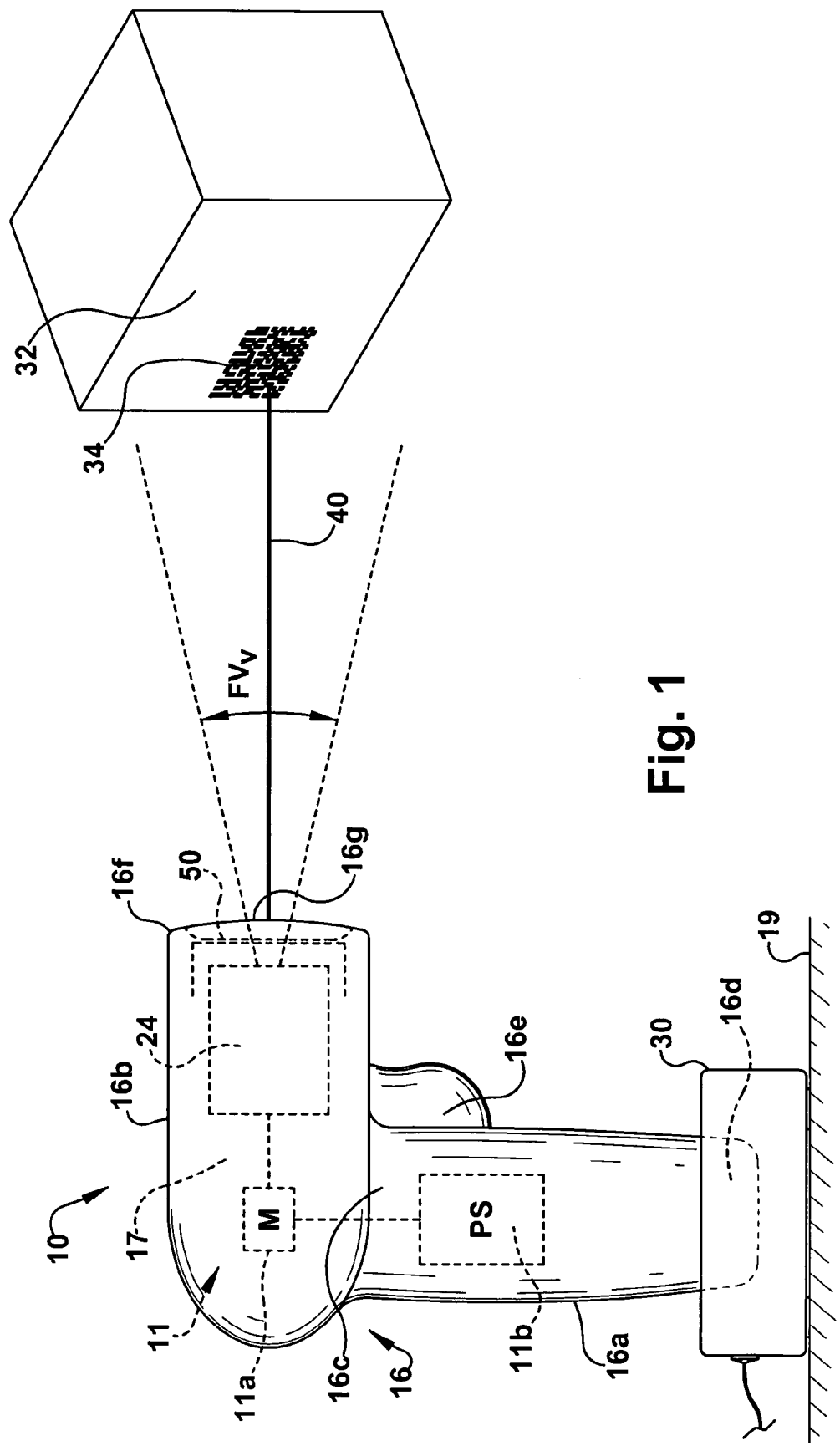
FIG. 1 is a schematic side elevation view of an exemplary embodiment of an imaging-based bar code reader of the present invention.
Figure 2:
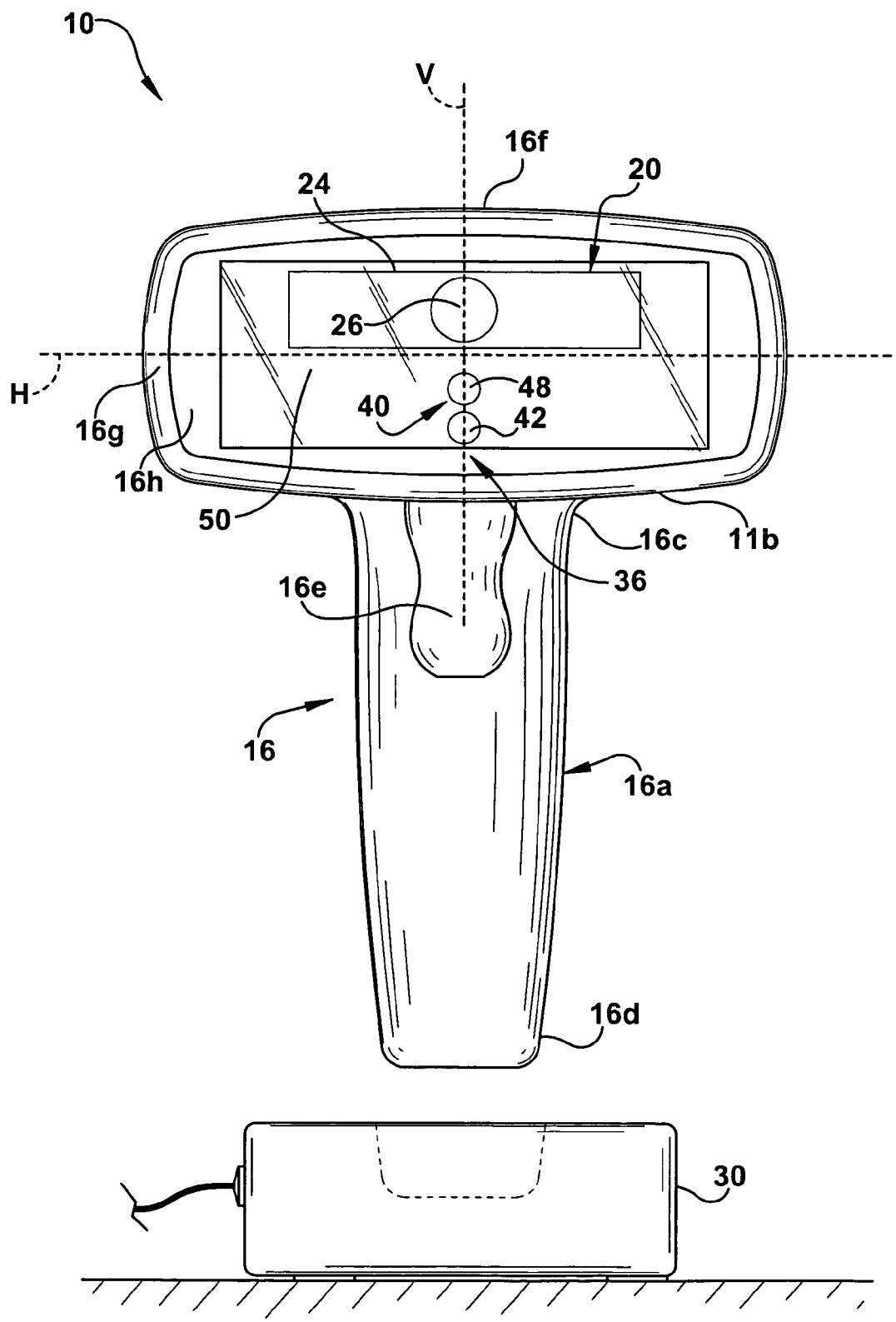
FIG. 2 is a schematic front elevation view of the bar code reader of FIG. 1.
Figure 3:
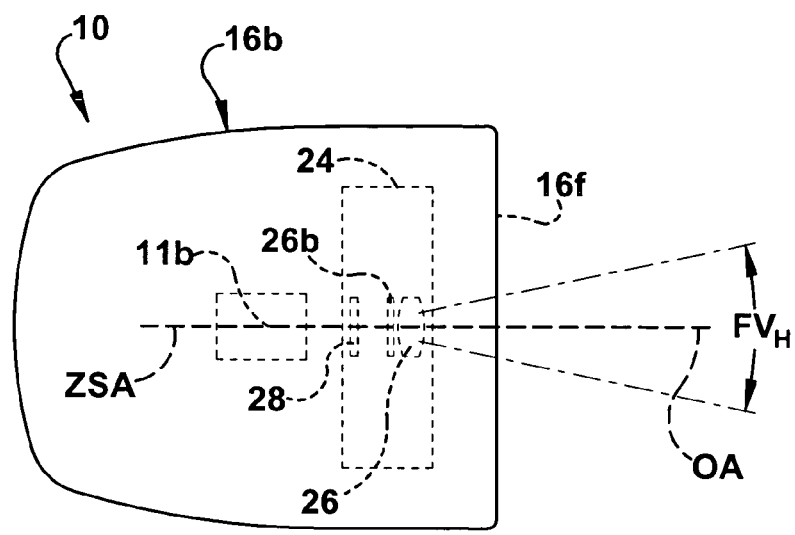
FIG. 3 is a schematic top plan view of the bar code reader of FIG. 1.

An exemplary embodiment of an imaging-based bar code reader of the present invention is shown schematically at 10 in FIGS. 1-5. The bar code reader 10 includes a two dimensional (2D) imaging system 12 and a decoding system 14 supported in a housing 16. The imaging and decoding systems 12, 14 are capable of reading, that is, imaging and decoding both 1D and 2D bar codes and postal codes. The reader 10 is also capable of capturing images and signatures.

The imaging system 12 is adapted to capture a series of image frames of a field of view FV of the imaging system. The series of image frames is shown schematically as 54 in FIG. 5. The series of image frames 54 comprises a sequence of individual image frames, shown schematically as 54a, 54b, 54c, 54d, 54e, 54f in FIG. 5, generated by the imaging system during an imaging session. It should be understood that the series of image frames 54 is not limited to any specific number of image frames, but will depend on the exposure and read out periods, how long the imaging system is actuated, etc.

The decoding system 14 is adapted to decode encoded indicia within a selected captured image frame. For example, as shown schematically in FIG. 5, an imaged bar code 34 within a captured image frame 54d will be located and decoded by the decoding system 14.

The housing 16 supports reader circuitry 11 within an interior region 17 of the housing 16. The reader circuitry 11 includes a microprocessor 11a and a power supply 11b. The power supply 11b is electrically coupled to and provides power to the circuitry 11. The housing 16 also supports the imaging and decoding systems 12, 14 within the interior region 17. The reader 10 includes a docking station 30 adapted to releasably receive the housing 16. The docking station 30 and the housing 16 support an electrical interface to allow electric coupling between circuitry resident in the housing 16 and circuitry resident in the docking station 30.

The imaging and decoding systems 12, 14 are part of the bar code reader circuitry 11, which operates under the control of the microprocessor 11a. The imaging and decoding systems 12, 14 may be separate assemblies which are electrically coupled or may be integrated into a single imaging and decoding system. When removed from the docking station 30 of the reader 10, power is supplied to the imaging and decoding systems 12, 14 by the power supply 11b. The circuitry 11, including the imaging and decoding systems 12, 14 of the present invention, may be embodied in hardware, software, firmware or electrical circuitry or any combination thereof. Moreover, portions of the circuitry 11 may be resident in the housing 16 or the docking station 30.

Advantageously, the bar code reader 10 of the present invention is adapted to be used in two modes of operation. In a hand-held or point-and-shoot mode of operation (FIG. 2), the reader 10 is carried and operated by a user walking or riding through a store, warehouse or plant for reading target bar codes for stocking and inventory control purposes. In the hand-held mode, the housing 16 is removed from a docking station 20 so the reader 10 can be carried by the user. The user grasps the housing gripping portion 16a and positions the housing 16 with respect to the target bar code 34 such that the target bar code 26 is within the field of view FV of the imaging system 12.

In the hand-held mode, imaging and decoding of the target bar code 34 is instituted by the user depressing a trigger switch 16e which extends through an opening near the upper part 16c of the gripping portion 16a. When the trigger 16e is depressed, the imaging system 12 generates a series of image frames 54 until either the user releases the trigger 16e, the image 34' of the target bar code 34 has been successfully decoded or a predetermined period of time elapses, whereupon the imaging system 12 awaits a new trigger signal.

In a fixed position or hands-free mode (FIG. 1), the reader 10 is received in the docking station 30 which is positioned on a substrate, such as a table or counter 19. The docking station 30 includes a generally planar lower surface to provide stability to the reader 10 when positioned on the substrate 19. In the fixed position mode, an object or item 32 with a target bar code 34 imprinted or affixed to it are brought to the reader 10 and positioned such that the target bar code 34 is within a field of view FV of the reader imaging system 12 for reading the target bar code 34. Typically, the imaging system 12 is always on or operational in the fixed position mode to image and decode any target bar code presented to the reader 10 within the field of view FV.

The docking station 30 is plugged into an AC power source and provides regulated DC power to the circuitry 11 of the reader 10. Thus, when the reader 10 is in the docking station 30 power is available to keep the imaging system 12 on continuously. In the fixed position mode, the imaging system 12 produces a continuous, sequential series of image frames 54 of the field of view FV.

Figure 6A:
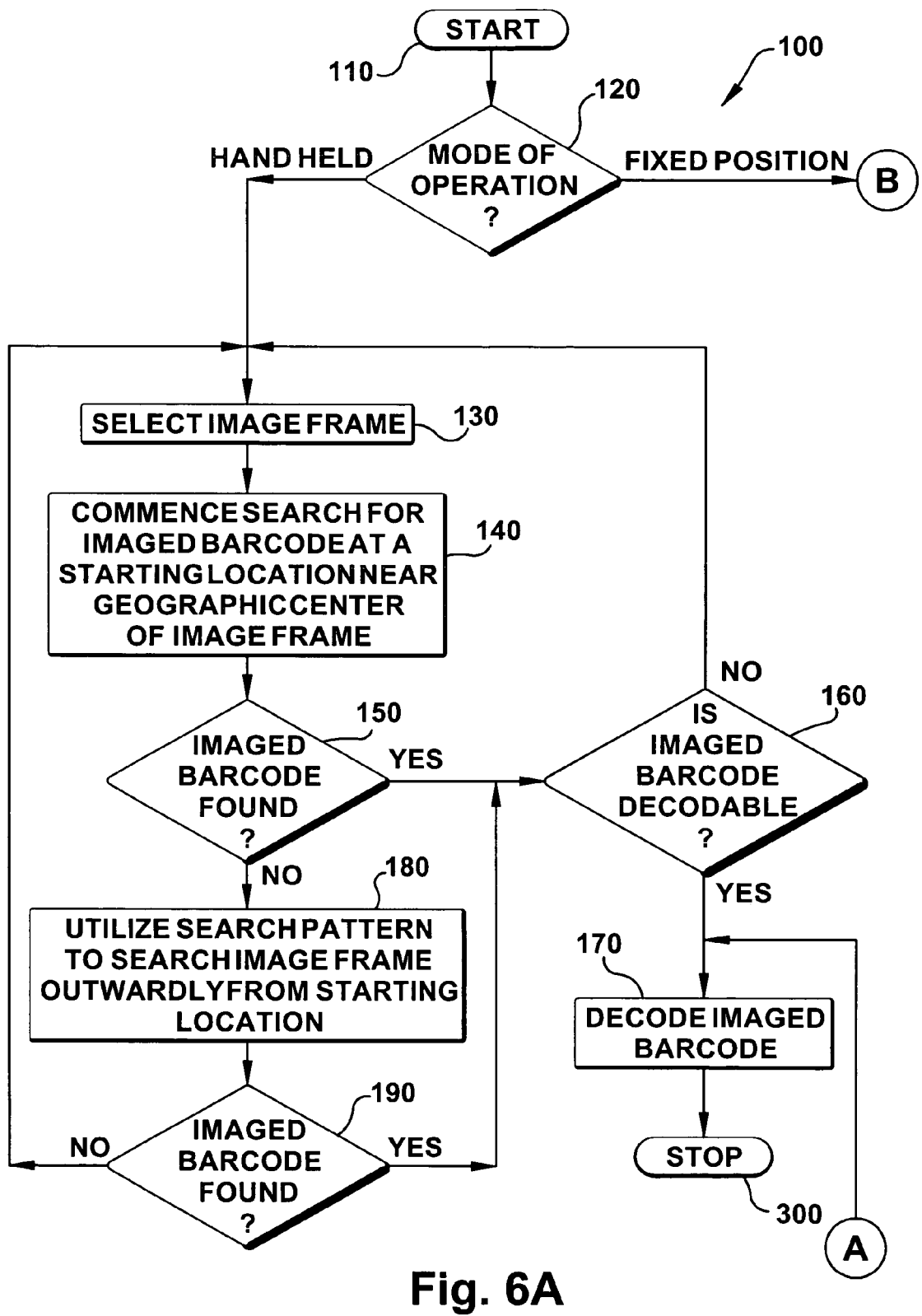
FIG. 6A is a first portion of a flow chart of a method of locating an imaged bar code utilized by a decoding system of the bar code reader.
Figure 6B:
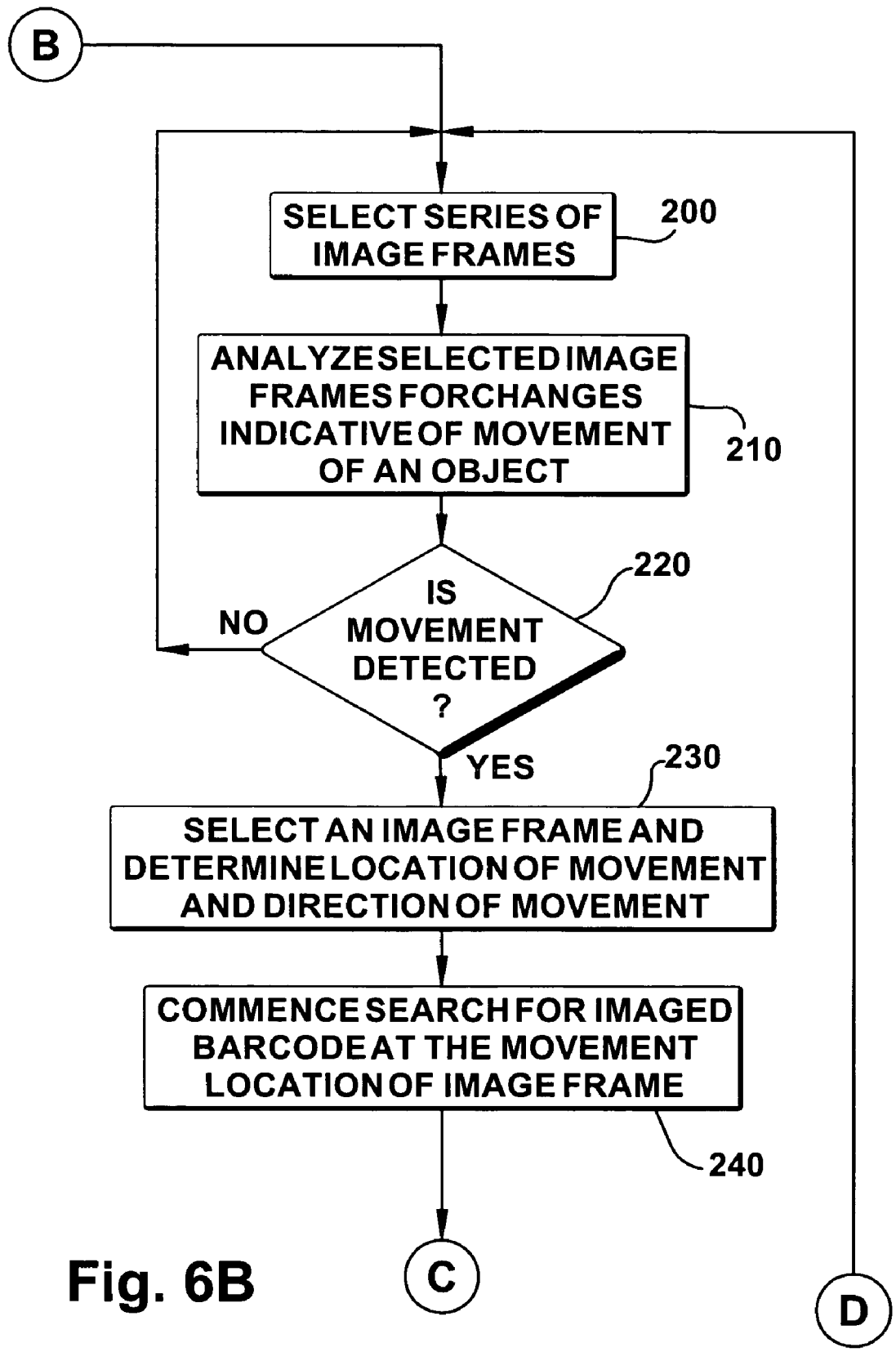
FIG. 6B is a second portion of the flow chart of the method of locating an imaged bar code utilized by a decoding system of the bar code reader.
Figure 6C:
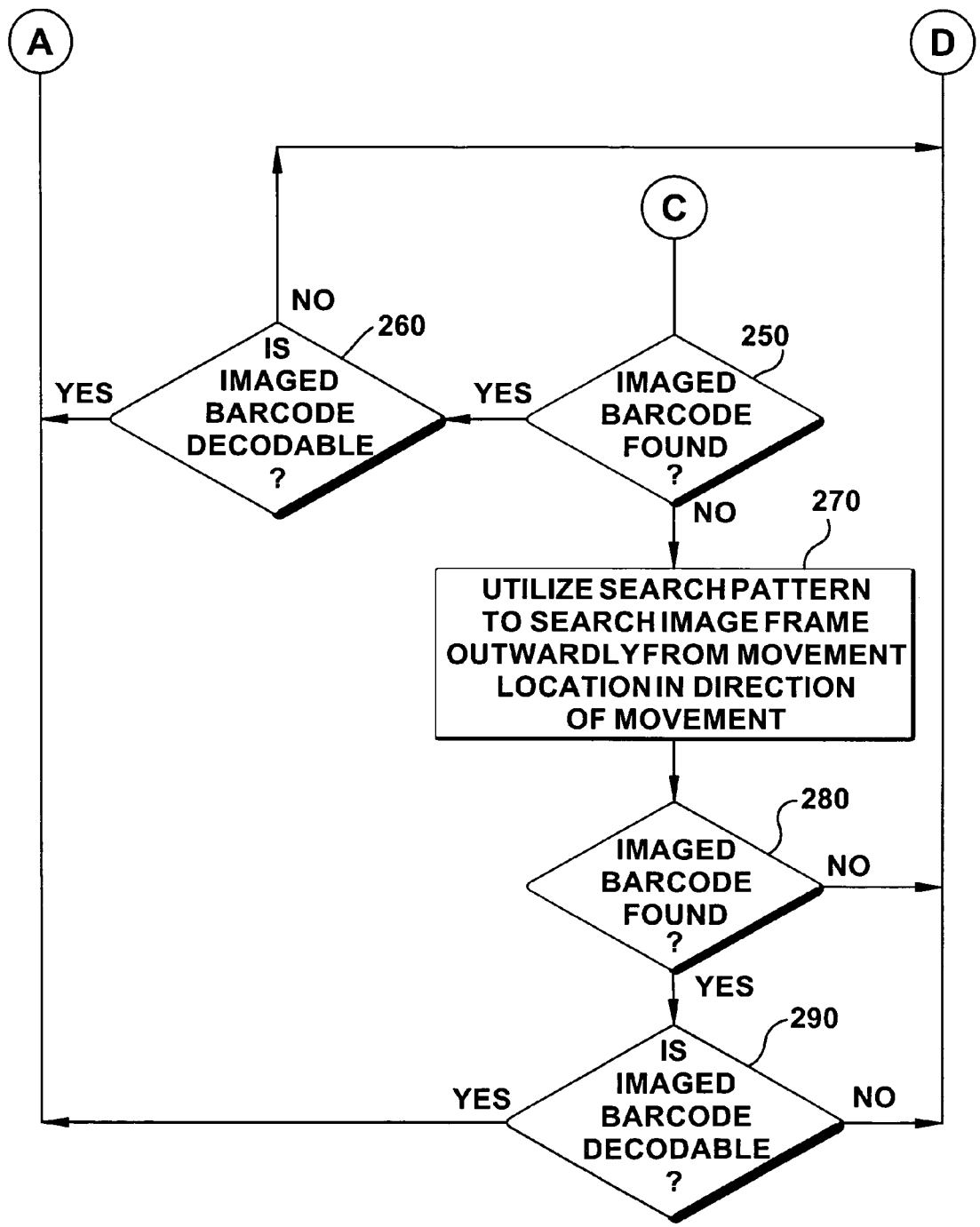
FIG. 6C is a third portion of a flow chart of the method of locating an imaged bar code utilized by a decoding system of the bar code reader.

As part of the decoding process, the decoding system 14 advantageously utilizes a method 100 (shown generally in a flow chart in FIG. 6) to efficiently locate an imaged bar code 34' within a selected captured image frame, for example, image frame 54d. The locating method 100 utilizes two different strategies or methodologies, depending on whether the reader 10 is being used in the hand-held mode or the fixed position mode. By tailoring the method utilized to locate the imaged bar code 34' within the selected captured image frame 54d based on the mode of operation of the reader 10, on the average, the time required to locate the imaged bar code 34' within the image frame 54d is reduced. Since the time required to locate the imaged bar code 34' is reduced, decoding time is similarly reduced and, accordingly, a total time required to successfully image and decode the target bar code 34 is reduced.

The bar code reader 10 includes an illumination system 36 to illuminate the target bar code 34 and an aiming system 38 which generates a visible aiming pattern 40 to aid the operator in aiming the reader 10 at the target bar code 34 when using the reader in the hand-held mode. The illumination system 36 typically includes one or more illumination LEDs 42 which are energized to direct illumination approximately along the field of view FV of the focusing lens 26 of the imaging system 12 (shown as I in FIG. 4).

Figure 4:
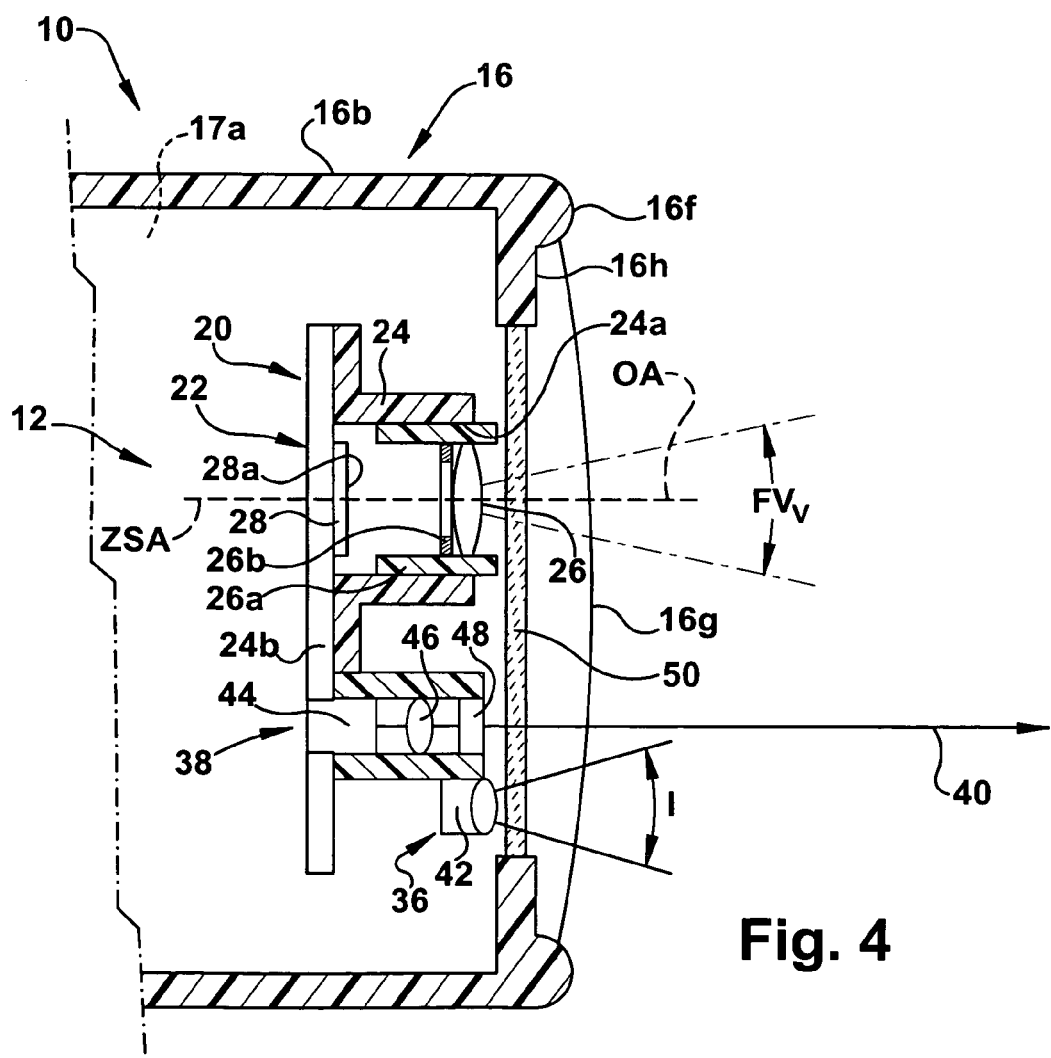
FIG. 4 is a schematic view partly in section and partly in side elevation of a camera assembly of an imaging assembly of the bar code reader of FIG. 1.

While the schematic representation of the illumination assembly 36 shown in FIG. 4 includes a single LED 42, it should be recognized that a plurality of LEDs 42 surrounding the field of view FV of the imaging system focusing lens 26 may advantageously provide for more uniform illumination of the target bar code 34 thereby avoiding shadows that might result from a single LED and, thus, enhancing decodability. Further, a plurality of LEDs 42 may provide for greater illumination intensity on the target bar code 34 which under poor ambient lighting conditions, may also enhance decodability.

The aiming system 38 generates the visible aiming pattern 40 comprising a single dot of illumination, a plurality of dots and/or lines of illumination or overlapping groups of dots/lines of illumination and includes a laser diode 44, a focusing lens 46 and a pattern generator 48 for generating the desired aiming pattern 40. Typically, the aiming system 38 is energized in the hand-held mode of operation to facilitate properly aiming the scanning head 16b at the target bar code 34. The aiming system 38 may also be used in the fixed position mode to project a pattern, for example, onto the counter 19 to indicate to a user where the target bar code 34 should be presented. This assumes that the scanning head 16b is oriented with respect to the docking station 30 and counter 19 such that the imaging system field of view FV is directed downwardly toward the counter 19. The aiming system 38 may be intermittently energized in a flash mode such that at least some of the captured image frames 54 do not include an image of the aiming pattern 40. The image of the aiming pattern 40 in an image frame may distort the imaged bar code 34' and complicate the decoding of the imaged bar code.

The imaging system 12 comprises an imaging camera assembly 20 and associated imaging circuitry 22. The imaging camera 20 includes a housing 24 supporting focusing optics including a focusing lens 26 and a 2D sensor or pixel array 28. The sensor array 28 is enabled during an exposure period to capture an image of the field of view FV of the imaging system 12. The field of view FV of the imaging system 12 is a function of both the configuration of the sensor array 28 and the optical characteristics of the focusing lens 26 and the distance and orientation between the array 28 and the lens 26. The imaging system 12 field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4.

The camera housing 24 is positioned within an interior region 17 of the scanning head 16*b*. The housing 24 is in proximity to a transparent window 50 defining a portion of a front wall 16*h* of the housing scanning head 16*b*. Reflected light from the target bar code 34 passes through the transparent window 50, is received by the focusing lens 26 and focused onto the imaging system sensor array 28. In an embodiment, the illumination assembly 36 and the aiming assembly 38 may be positioned behind the window 50. Illumination from the illumination LEDs 42 and the aiming pattern 40 generated by the aiming assembly 38 also pass through the window 50.

The imaging circuitry 22 may be disposed within, partially within, or external to the camera assembly housing 24. Shown schematically in FIG. 4, the imaging camera housing 24 is supported with the scanning head 16*b* of the housing 16. The focusing lens 26 is supported by a lens holder 26*a*. The camera housing 24 defines a front opening 24*a* that supports and seals against the lens holder 26*a* so that the only illumination incident upon the sensor array 28 is illumination passing through the focusing lens 26. Depending on the specifics of the camera assembly 20, the lens holder 26*a* may slide in and out within the camera housing front opening 24*a* to allow dual focusing under the control of the imaging circuitry 22 or the lens holder 26*a* may be fixed with respect to the camera housing 25 in a fixed focus camera assembly. The lens holder 26*a* is typically made of metal. A back end of the housing 24 may be comprised of a printed circuit board 24*b*, which forms part of the imaging circuitry 22 and may extend beyond the housing 24 to support the illumination system 36 and the aiming apparatus 38.

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280× 1024 pixels. The illumination-receiving pixels of the pixel array define a sensor array surface 28*a* (best seen in FIG. 4). The pixel array 28 is secured to the printed circuit board 24*b*, in parallel direction for stability. The sensor array surface 28*a* is substantially perpendicular to an optical axis OA of the focusing lens 26, that is, a z axis (labeled ZSA in FIG. 4) that is perpendicular to the sensor array surface 28*a* would be substantially parallel to the optical axis OA of the focusing lens. The pixels of the sensor array surface 28*a* are disposed in an orthogonal arrangement of rows and columns of pixels. As is best seen in FIG. 4, the focusing lens 26 focuses light reflected from the target bar code 34 through an aperture 26*b* onto the sensor array surface 28*a* of the pixel/photosensor array 28. Thus, the focusing lens 26 focuses an image of the target bar code 14 (assuming it is within the field of view FV) onto the array of pixels comprising the pixel array 28.

Figure 5:
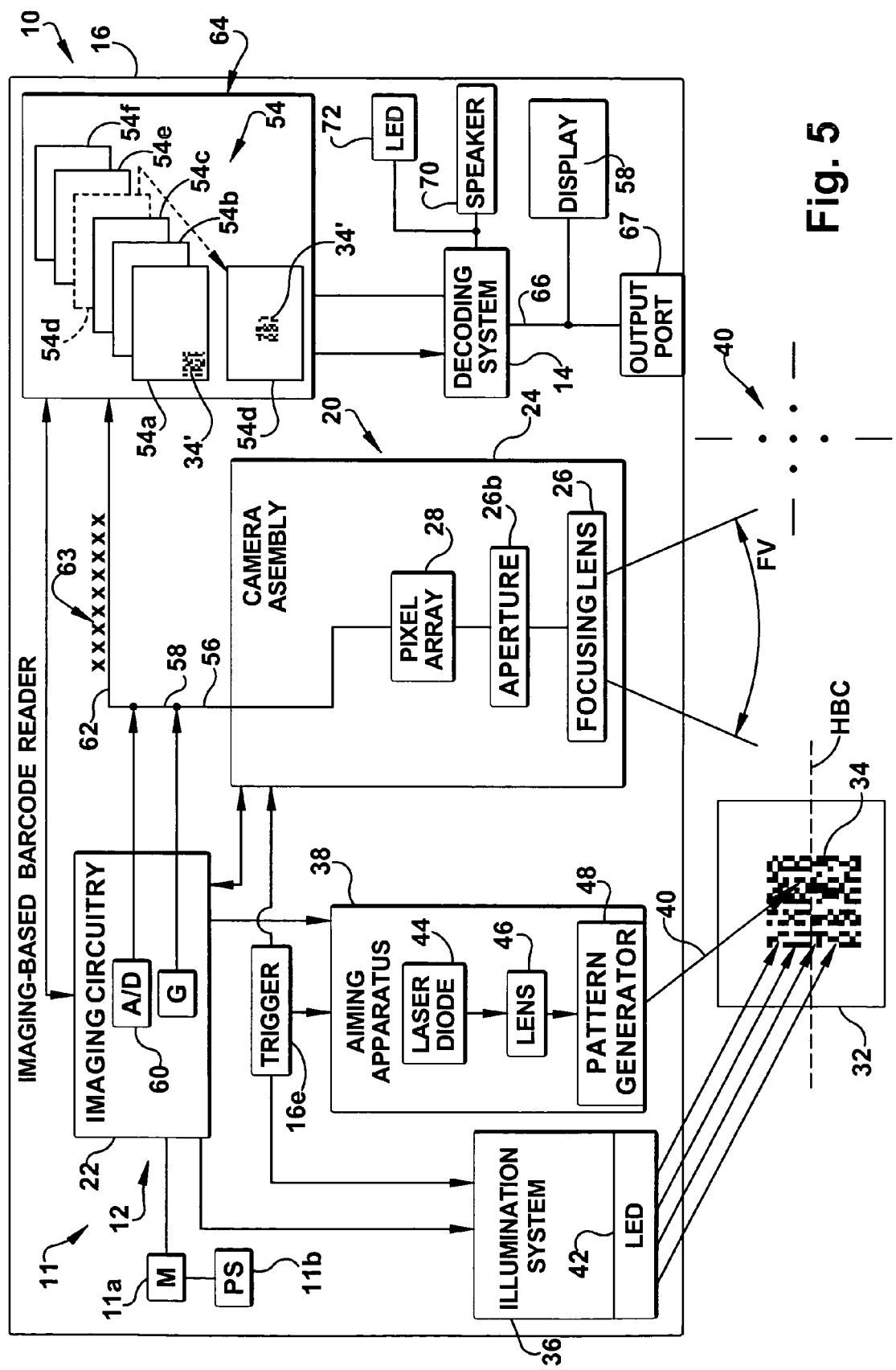
FIG. 5 is a schematic block diagram of the bar code reader of FIG. 1.

In the hand-held mode of operation, aided by the aiming system 38, the user will accurately point the housing 16 at the target bar code 34 and, assuming the target bar code 34 is within the field of view FV of the imaging assembly 12, each image frame 54*a*, 54*b*, 54*c*, . . . of the series of image frames 54 includes an image 34' of the target bar code 34 (shown schematically in FIG. 5). The decoding system 14 selects an image frame from the series of image frames 54 and attempts to locate and decode a digitized version of the image bar code 34'.

The image frame selected for decoding by the decoding system 14 is typically an image frame captured when the aiming system 38 is turned off, otherwise, the aiming pattern 40 projected onto the target bar code 34 may distort the resulting imaged bar code 34'. In the fixed position mode of operation, the imaging system 12 is continuously generating a series of image frames 54. Since most of these captured frames 54 will not include an imaged bar code, the decoding system must analyze the series of image frames to find a subset of the series of image frames 54 (say 54*a*-54*d* in FIG. 5) that include the imaged bar code 34'. One of this image frame subset 54*a*-54*d*, one of the captured image frames 54*d* is selected for decoding.

Electrical signals are generated by reading out of some or all of the pixels of the pixel array 28 after an exposure period generating an analog signal 56 (FIG. 4). In some sensors, particularly CMOS sensors, all pixels of the pixel array 28 are not exposed at the same time, thus, reading out of some pixels may coincide in time with an exposure period for some other pixels.

The analog image signal 56 represents a sequence of photosensor voltage values, the magnitude of each value representing an intensity of the reflected light received by a photosensor/pixel during an exposure period. The analog signal 46 is amplified by a gain factor, generating an amplified analog signal 58. The imaging circuitry 22 further includes an analog-to-digital (A/D) converter 60. The amplified analog signal 58 is digitized by the A/D converter 60 generating a digitized signal 62. The digitized signal 62 comprises a sequence of digital gray scale values 63 typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness).

The digitized gray scale values 63 of the digitized signal 62 are stored in a memory 64. The digital values 63 corresponding to a read out of the pixel array 28 constitute the image frame 54, which is representative of the image projected by the focusing lens 26 onto the pixel array 28 during an exposure period. If the field of view FV of the focusing lens 26 includes the target bar code 34, then a digital gray scale value image 14' of the target bar code 14 would be present in the image frame 54.

The decoding circuitry 14 then operates on the digitized gray scale values 63 of the image frame 54 and attempts to decode any decodable image within the image frame, e.g., the imaged target bar code 14'. If the decoding is successful, decoded data 66, representative of the data/information coded in the bar code 34 is then output via a data output port 67 and/or displayed to a user of the reader 10 via a display 68. Upon achieving a good "read" of the bar code 34, that is, the bar code 34 was successfully imaged and decoded, a speaker 70 and/or an indicator LED 72 is activated by the bar code reader circuitry 13 to indicate to the user that the target bar code 14 has successfully read, that is, the target bar code 14 has been successfully imaged and the imaged bar code 14' has been successfully decoded.

Imaged Bar Code Locating Method 100

As noted above, the reader decoding system 14 of the present invention includes a method for locating the imaged bar code 34' in a selected captured image frame 54*d* of the series of image frames 54. The method is shown schematically in the flow chart of FIGS. 6A-6C and, advantageously incorporates two methods for locating the imaged bar code 34', a first method is used by the decoding system 14 when the reader 100 is used in the hand-held mode (shown in the steps 130, 140, etc.,) and following the path indicated by the arrow labeled "hand held" exiting decision step 120 and a second method is used by the decoding system 14 when the reader 100 is used in the fixed position mode (shown in steps 200, 210, etc.) and flowing the path indicated by the arrow labeled "fixed position" exiting decision step 120.

At step 110, the method 100 commences with the initiation of an imaging session, whether the imaging session is initiated by a user depressing the trigger 16*e* in the hand-held mode of operation or placing the housing 16 in the docking station 30 and providing power to the reader circuitry 11 via electrical connections with the docking station 30 in the fixed position mode of operation. At step 120, the decoding system 14 determines or receives an input from other circuitry 11 as to what mode of operation the reader is in, i.e., hand-held or fixed position.

Figure 7:
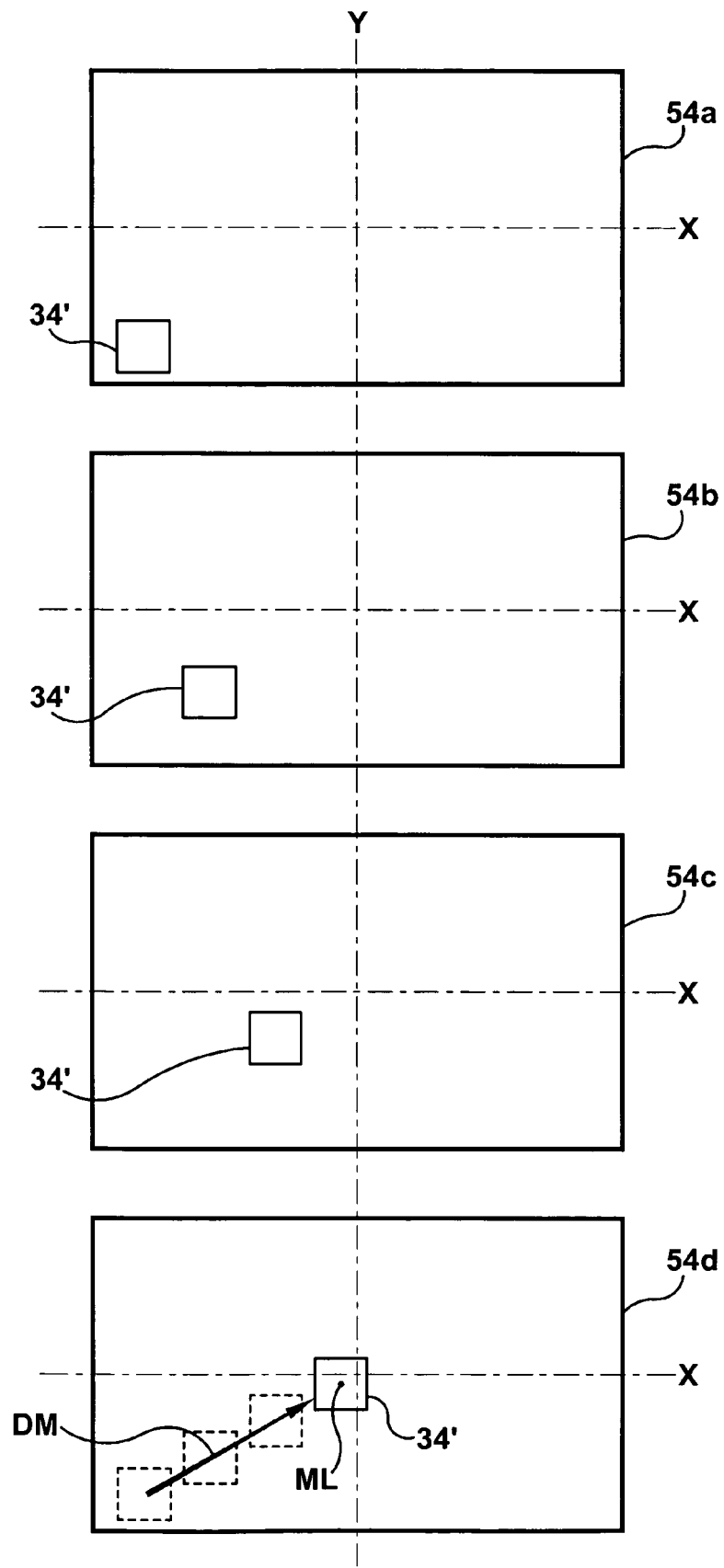
FIG. 7 is a schematic representation of a sequential series of captured image frames illustrating movement of a target bar code toward a center of the image frames when the reader is used in a fixed position mode.

If the reader 10 is being used in the hand-held mode, at step 130, a captured image frame (for example, image frame 54*d*) is selected for decoding. Generally, the selected image frame 54*d* is a captured frame that was obtained with the aiming assembly 38 off. At step 140, the decoding system 14 commences a search for an imaged bar code 34' within the selected image frame 54*d* starting at or near the geographic center of the captured image frame 54*d*. Recall that the captured image frame 54*d* is stored in memory 64 as a string of digital gray scale values 63, so when the "geographic center" of the image frame 54*d* is referred to, it should be understood that this refers to a virtual representation of the geographical center in the memory 64, as no physical geographical center or physical captured image frame exist. In FIG. 7, which provides a schematic representation of a series of captured image frames 54*a*, 54*b*, 54*c*, 54*d*, the geographic center for each image frame 54*a*-54*d* is represented by the intersection of the vertical and horizontal axis labeled X and Y.

At step 150, the decoding system determines if an imaged bar code 34' has been located at the geographic center, that is, the coordinates (X,Y), of the selected image frame 54*d*. Since the geographic center (X,Y) is a point, by geographic center (X,Y) what is actually meant is a small area of pixels, by way of example only, say, a 10×10 array of pixels, of the image frame 54*d* surrounding or bounding the geographic center point (X,Y). The digitized gray scale values 64 of the array of pixels comprising the geographic center (X,Y) are examined to see if a portion of an imaged bar code 34' is present at the geographic center (X,Y). For example, in FIG. 7, in image frame 54*d*, the imaged bar code 34' overlaps the geographic center (X,Y) of the image frame. An examination of the gray scale values of the pixel array comprising the geographic center (X,Y) would, therefore, indicate the presence of a portion of the imaged bar code 34'. Thus, it would be proper to say that the imaged bar code 34' is located at the geographic center (X,Y) of the image frame 54*d*.

If the imaged bar code 34' is located at the geographic center (X,Y) of the image frame 54*d*, then at step 160, the decoding system 14 determines the extent or bounds of the imaged bar code 34' (the outline of the imaged bar code 34' as shown in FIG. 7) and determines if the imaged bar code 34' is decodable.

If the located imaged bar code 34' is found to be decodable, then at step 170, the imaged bar code 34' is decoded and a signal is sent to the LED 72, speaker 70 and/or display 58 to indicate to the user that a successful read of the target bar code 34 has been achieved. The method 100 then terminates at step 300.

If at step 160, the located imaged bar code 34' is found not to be decodable, then the process returns to step 130, wherein another image frame of the series of image frames 54 is selected and the steps continue as specified above. If at step 150, an imaged bar code 34' is not found in the selected image frame 54*d*, then at step 180, the decoding system employs a search algorithm or pattern to attempt to locate an imaged bar code 34' in the image frame 54*d*. The search pattern begins at the geographic center (X,Y) (which has already been examined for an imaged bar code in step 140) and moves outwardly from the starting location to sequentially examine groups or arrays of pixels comprising the image frame 54*d* which fall along the search pattern. The digitized gray scale values 63 of the groups of pixels along the search pattern are sequentially examined to determine if the gray scale values 63 are indicative of portions of the imaged bar code 34'. One preferred search algorithm utilizes a spiral pattern which searches outwardly in a spiral from the geographic center coordinates (X,Y).

At step 190, if during the execution of the search pattern on the selected image frame 54*d*, the imaged bar code 34' is located, then the process moves to step 160 where the bounds of the imaged bar code 34' are found and a determination is made as to whether the imaged bar code is decodable. The process then continues at step 160 as recited above. If at step 190, the search pattern is executed to completion and no imaged bar code 34' is found in the image frame 54*d*, then the process returns to step 130 and a new image frame is selected for analysis and the process continues as recited above.

If at step 120, the mode of operation of the reader 10 is determined to be a fixed position mode, then at step 200, the decoding system selects a series of image frames 54. For example, twenty captured image frames may be the analyzed series 54. The image frames are sequential, though not necessarily in order, one-by-one, e.g., the selected series of image frames 54 may be frames x, x+1, x+2, x+3, x+4, x+5, x+6, x+7, x+8, . . . , x+20 or they may be x, x+1, x+4, x+7, x+8, x+9, x+13, x+17, . . . , x+42. At step 210, the selected series of image frames 54 are analyzed for changes from frame to frame that would be indicative of movement of an object across the field of view FV of the imaging system 12 between image frames. Such movement would naturally occur as the user moves the target bar code 34 toward the transparent window 50 and attempts to center the target bar code 34 with respect to the window 50 to facilitate reading of the bar code.

At step 220, a determination is made by the decoding system 14 if the movement of an object is detected in the series of captured image frames 54. If movement is detected at step 220, then at step 230, one of the series of image frames (say frame 54*d*) is selected and the selected image frame 54*d* and adjacent image frames (say 54*b*, 54*c*, 54*e*, 54f) are examined to determine the location of movement ML and the direction of movement DM with respect to the selected image frame 54d. The movement of an object (that is, the imaged bar code 34') and the direction of movement of the object are shown schematically for image frames 54a, 54b, 54c and 54d in FIG. 7.

Once the location and direction of movement ML, DM are determined for the selected image frame 54d, then at step 240, the decoding system 14 commences a search for the imaged bar code 34' at the movement location ML of the selected image frame 54d. The movement location ML will typically comprise a small array of pixels (by way of example only, a 10×10 pixel array) bounding the movement location ML. The digitized gray scale values 63 of the array of pixels corresponding to the movement location ML are examined to determine if a portion of the imaged bar code 34' is found in the array of pixels corresponding to the movement location ML.

If an examination of the gray scale values of the pixel array comprising the movement location ML indicates the presence of a portion of the imaged bar code 34', then it would be said that the imaged bar code 34' is located at the movement location ML of the image frame 54d. At step 250, a determination is made if the imaged bar code 34' is found at the movement location ML of the selected image frame 54d. If the imaged bar code 34' is located at the movement location ML of the image frame 54d, then at step 260, the decoding system 14 determines the extent or bounds of the imaged bar code 34' (the outline of the imaged bar code 34' as shown in FIG. 7) and determines if the imaged bar code 34' is decodable.

If at step 260, the located imaged bar code 34' is found to be decodable, then the process shifts to step 170 and, as explained above, the imaged bar code 34' is decoded and a signal is sent to the LED 72, speaker 70 and/or display 58 to indicate to the user that a successful read of the target bar code 34 has been achieved. The process 100 then terminates at step 300.

If at step 260, the located imaged bar code 34' is found not to be decodable, then the process returns to step 200, wherein another series of image frames 54 is selected and the steps continue as specified above. The new series of image frames may include some or none of the previous series of image frames. If at step 250, an imaged bar code 34' is not found in the selected image frame 54d, then at step 280, the decoding system employs a search algorithm or pattern to attempt to locate an imaged bar code 34' in the image frame 54d. The search pattern begins at the movement location ML (which has already been examined for an imaged bar code in step 240) and moves outwardly from the starting location to sequentially examine groups or arrays of pixels comprising the image frame 54d which fall along the search pattern. Preferably, the outward movement of the search pattern is generally biased toward the movement direction DM found in step 230.

The idea of biasing the search pattern in the movement direction DM is that the user, when moving the target bar code 34 within the field of view FV will naturally attempt to move the bar code 34 from a periphery of the field of view toward the center of the window 50. Thus, a direction vector represented by the direction of movement DM should point in the direction that the target bar code is being moved. Accordingly, by searching in the movement direction DM, there is a greater probability of locating the imaged bar code 34' than when searching in any random direction. The digitized gray scale values 63 of the groups of pixels along the search pattern are sequentially examined to determine if the gray scale values 63 are indicative of portions of the imaged bar code 34'.

At step 280, if during the execution of the search pattern on the selected image frame 54d, the imaged bar code 34' is located, then the process moves to step 290 where the bounds of the imaged bar code 34' are found and a determination is made as to whether the imaged bar code is decodable. The process then continues at step 290 where a determination is made as to whether the imaged bar code 34' is decodable. If at step 290, the imaged bar code 34 is found by the decoding system 14 to be decodable, then the process moves to step 170 where the imaged bar code 34' is decoded, a good read signal is generated to indicate a successful read of the target bar code 34 and the process terminates at 300.

If at step 290, the imaged bar code 34' is found to be undecodable, then the process shifts to step 200 and, as described above, a new series of image frames is selected for analysis. If at step 270, the search pattern is executed to completion and no imaged bar code 34' is found in the image frame 54d, then the process returns to step 200 and, as described above, a new series of image frames is selected for analysis.

It should also be understood that the present invention also encompasses and includes a computer-readable media having computer-executable instructions for performing the method of locating an imaged bar code in a captured image frame for an imaging-based bar code reader, as described above and set forth in FIGS. 6A-6C.

While the present invention has been described with a degree of particularity, it is the intent that the invention includes all modifications and alterations from the disclosed design falling within the spirit or scope of the appended claims.

We claim:

1. A method of locating an imaged bar code in a captured image frame for an imaging-based bar code reader, the steps of the method comprising:

determining a mode of operation of the reader;

if the reader is being operated in a hand-held mode of operation, utilizing a first method of locating the imaged bar code wherein the first method of locating the imaged bar code includes the steps of:

selecting a captured image frame;

searching for the imaged bar code commencing at a starting location near a geographic center of the selected image frame; and if no imaged bar code is found at the starting location, utilizing a search pattern to search outwardly from the starting location until the imaged bar code is found; and if the reader is being operated in a fixed position mode, utilizing a second method of locating the imaged bar code wherein the second method of locating the imaged bar code includes the steps of:

analyzing a series of captured image frames for changes in the series of captured image frames indicative of a movement of an object in the series of captured image frames;

determining a location corresponding to the movement in a selected image frame of the series of captured image frames;

searching for the imaged bar code commencing at the movement location within the selected image frame; and if no imaged bar code is found at the movement location, utilizing a search pattern to search outwardly from the movement location until the imaged bar code is found.

2. The method of claim 1 wherein in the first method, the search pattern searches outwardly in a spiral pattern from the starting location.

3. The method of claim 1 wherein the steps of the second method further include determining a direction of the movement of the object in the series of captured image frames and, if no imaged bar code is found at the movement location, the search pattern searches outwardly from the movement location in the direction of the movement of the object.

4. An imaging-based bar code reader adapted to be used in a hand-held mode of operation and a fixed position mode of operation, the reader comprising:
   an imaging system including a sensor array for imaging a target bar code and generating captured image frames of a field of view of the imaging system;
   a decoding system for decoding an image of the target bar code located within a captured image frame;
   the decoding system utilizing a first method of locating an imaged bar code in the captured image frame if the reader is operated in the hand-held mode, the first method of locating an imaged bar code including the steps of:
   selecting a captured image frame;
   searching for the imaged bar code commencing at a starting location near a geographic center of the selected image frame; and
   if no imaged bar code is found at the starting location, utilizing a search pattern to search outwardly from the starting location until the imaged bar code is found; and
   the decoding system utilizing a second method of locating the imaged bar code in a captured image frame if the reader is operated in the stationary mode, the second method of locating the imaged bar code includes the steps of:
   analyzing a series of captured image frames for changes in the series of captured image frames indicative of a movement of an object in the series of captured image frames;
   determining a location corresponding to the movement in a selected image frame of the series of captured image frames;
   searching for the imaged bar code commencing at the movement location within the selected image frame; and
   if no imaged bar code is found at the movement location, utilizing a search pattern to search outwardly from the movement location until the imaged bar code is found.

5. The bar code reader of claim 4 wherein in the first method, the search pattern searches outwardly in a spiral pattern from the starting location.

6. The bar code reader of claim 4 wherein the steps of the second method further include determining a direction of the movement of the object in the series of captured image frames and, if no imaged bar code is found at the movement location, the search pattern searches outwardly from the movement location in the direction of the movement of the object.

7. The bar code reader of claim 4 wherein the reader includes a portable housing and a docking station adapted to receive the portable housing, the housing being removable from the docking station when the reader is used in the hand-held mode and to be received in the docking station when the reader is used in the fixed position mode.

8. The bar code reader of claim 7 wherein the docking station includes a planar lower surface adapted to be positioned on a counter to facilitate operation of the reader in the fixed position mode.

9. The bar code reader of claim 7 wherein the docking station and portable housing including an electrical interface to electrically couple circuitry located in the housing and circuitry located in the docking station when the housing is received in the docking station.

10. The bar code reader of claim 4 wherein the imaging system and the decoding system are integral.

11. The bar code reader of claim 4 wherein the imaging system includes focusing optics for focusing illumination from the field of view onto the sensor array.

12. The bar code reader of claim 4 wherein the sensor array of the imaging system is a 2D sensor array.

13. The bar code reader of claim 11 wherein the imaging assembly includes a camera assembly disposed within a camera assembly housing, the camera assembly supporting the focusing optics and the sensor array.

14. The bar code reader of claim 4 further including an illumination system to direct illumination along the field of view of the imaging system.

15. The bar code reader of claim 4 further including an aiming system to facilitate aiming of the reader at the target bar code in the hand-held mode of operation.

16. The bar code reader of claim 15 wherein, in the first method, the selected image frame is an image frame acquired when the aiming system was turned off.

17. The bar code reader of claim 4 further including an aiming system to facilitate positioning the target bar code within the field of view of the imaging system in the fixed position mode of operation.

18. A decoding system for use with an imaging-based bar code reader adapted to be used in a hand-held mode of operation and a fixed position mode of operation, the decoding system comprising:
   circuitry for decoding an image of the target bar code located within a captured image frame;
   the decoding system utilizing a first method of locating the imaged bar code in the captured image frame if the reader is operated in the hand-held mode, the first method of locating an imaged bar code including the steps of:
   selecting a captured image frame;
   searching for the imaged bar code commencing at a starting location near a geographic center of the selected image frame; and
   if no imaged bar code is found at the starting location, utilizing a search pattern to search outwardly from the starting location until the imaged bar code is found; and
   the decoding system utilizing a second method of locating the imaged bar code in a captured image frame if the reader is operated in the stationary mode, the second method of locating an imaged bar code includes the steps of:
   analyzing a series of captured image frames for changes in the series of captured image frames indicative of a movement of an object in the series of captured image frames;
   determining a location corresponding to the movement in a selected image frame of the series of captured image frames;
   searching for the imaged bar code commencing at the movement location within the selected image frame; and if no imaged bar code is found at the movement location, utilizing a search pattern to search outwardly from the movement location until the imaged bar code is found.

19. The decoding system of claim 18 wherein in the first method, the search pattern searches outwardly in a spiral pattern from the starting location.

20. The decoding system of claim 18 wherein the steps of the second method further include determining a direction of the movement of the object in the series of captured image frames and, if no imaged bar code is found at the movement location, the search pattern searches outwardly from the movement location in the direction of the movement of the object.

21. Computer-readable media having computer-executable instructions for performing a method of locating an imaged bar code in a captured image frame for an imaging-based bar code reader, the steps of the method comprising:
  determining a mode of operation of the reader;
  if the reader is being operated in a hand-held mode of operation, utilizing a first method of locating the imaged bar code wherein the first method of locating the imaged bar code includes the steps of:
  selecting a captured image frame;
  searching for the imaged bar code commencing at a starting location near a geographic center of the selected image frame; and
  if no imaged bar code is found at the starting location, utilizing a search pattern to search outwardly from the starting location until the imaged bar code is found; and
  if the reader is being operated in a fixed position mode, utilizing a second method of locating the imaged bar code wherein the second method of locating the imaged bar code includes the steps of:
  analyzing a series of captured image frames for changes in the series of captured image frames indicative of a movement of an object in the series of captured image frames;
  determining a location corresponding to the movement in a selected image frame of the series of captured image frames;
  searching for the imaged bar code commencing at the movement location within the selected image frame; and
  if no imaged bar code is found at the movement location, utilizing a search pattern to search outwardly from the movement location until the imaged bar code is found.

22. An imaging-based bar code reader adapted to be used in a hand-held mode of operation and a fixed position mode of operation, the reader comprising:
  means for imaging a target bar code and generating captured image frames of a field of view of the imaging system;
  means for decoding an image of the target bar code located within a captured image frame;
  the means for decoding utilizing a first method of locating the imaged bar code in a captured image frame if the reader is operated in the hand-held mode, the first method of locating the imaged bar code including the steps of:
  selecting a captured image frame;
  searching for the imaged bar code commencing at a starting location near a geographic center of the selected image frame; and
  if no imaged bar code is found at the starting location, utilizing a search pattern to search outwardly from the starting location until the imaged bar code is found; and
  the means for decoding utilizing a second method of locating the imaged bar code in a captured image frame if the reader is operated in the stationary mode, the second method of locating the imaged bar code includes the steps of:
  analyzing a series of captured image frames for changes in the series of captured image frames indicative of a movement of an object in the series of captured image frames;
  determining a location corresponding to the movement in a selected image frame of the series of captured image frames;
  searching for the imaged bar code commencing at the movement location within the selected image frame; and
  if no imaged bar code is found at the movement location, utilizing a search pattern to search outwardly from the movement location until the imaged bar code is found.

* * * * *